United States Patent
Narayana et al.

(10) Patent No.: US 10,802,875 B2
(45) Date of Patent: Oct. 13, 2020

(54) MULTITHREAD FRAMEWORK FOR USE IN PRE-BOOT ENVIRONMENT OF A SYSTEM-ON-CHIP

(71) Applicant: QUALCOMM Incorporated, San Diego, CA (US)

(72) Inventors: Yugandhar Narayana, San Diego, CA (US); Dhamim Packer Ali, San Diego, CA (US); Ajay Iyengar, San Diego, CA (US); Kedar Athawale, San Diego, CA (US); Eric Tallet, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 57 days.

(21) Appl. No.: 16/203,386

(22) Filed: Nov. 28, 2018

(65) Prior Publication Data

US 2019/0332425 A1 Oct. 31, 2019

Related U.S. Application Data

(60) Provisional application No. 62/664,661, filed on Apr. 30, 2018.

(51) Int. Cl.
*G06F 9/46* (2006.01)
*G06F 9/48* (2006.01)
(Continued)

(52) U.S. Cl.
CPC .......... *G06F 9/4881* (2013.01); *G06F 9/3851* (2013.01); *G06F 9/4812* (2013.01); *G06F 9/52* (2013.01)

(58) Field of Classification Search
CPC .... G06F 9/4881; G06F 9/2851; G06F 9/4812; G06F 9/52
See application file for complete search history.

(56) References Cited

U.S. PATENT DOCUMENTS 4,521,879 A * 6/1985 Gueldenpfennig .......................... H04Q 11/0407 370/267
6,886,162 B1 * 4/2005 McKenney ............. G06F 9/526 711/124

(Continued)

FOREIGN PATENT DOCUMENTS

EP 2972795 A1 1/2016

OTHER PUBLICATIONS

International Search Report and Written Opinion—PCT/US2019/026295—ISA/EPO—dated Jun. 19, 2019.
(Continued)

*Primary Examiner* — Camquy Truong
(74) *Attorney, Agent, or Firm* — Patterson + Sheridan, LLP

(57) ABSTRACT

Various aspects are described herein. In some aspects, the disclosure provides a method for a system-on-chip (SoC) including one or more computing cores. The method includes providing a scheduler to schedule running of threads on the one or more computing cores in a pre-boot environment including a core thread configured to provide a plurality of services. The method further includes providing, by the scheduler, a first lock for the core thread. The method further includes initializing, by the core thread, one or more additional services separate from the plurality of services. The method further includes selectively allowing access to the plurality of services of the core thread to one or more additional threads based on a status of the first lock. The method further includes allowing access to the one or more additional services to the one or more additional threads independent of the status of the first lock.

26 Claims, 9 Drawing Sheets

(51) Int. Cl.
*G06F 9/38* (2018.01)
*G06F 9/52* (2006.01)

(56) References Cited

U.S. PATENT DOCUMENTS

| | | | | |
|---|---|---|---|---|
| 9,043,796 B2* | 5/2015 | Tillier | ................. | G06F 9/52 |
| | | | | 718/102 |
| 2007/0169002 A1* | 7/2007 | Kronlund | ............... | G06F 9/526 |
| | | | | 717/130 |
| 2017/0139745 A1 | 5/2017 | Scheuer | | |
| 2017/0286187 A1 | 10/2017 | Chen et al. | | |

OTHER PUBLICATIONS

N N: "Driver Writer's Guide for UEFI 2.3.1—Version 1.01 ", Aug. 3, 2012 (Aug. 3, 2012), XP055326231, 579 Pages, Retrieved from the Internet: URL:https://github.com/tianocore-docs/Docs/raw/master/Driver_Developer/UEFI_Driver_Writer_Guide_V1.0.1_120308.pdf [retrieved on Dec. 6, 2016] p. 141.

* cited by examiner

MULTITHREAD FRAMEWORK FOR USE IN PRE-BOOT ENVIRONMENT OF A SYSTEM-ON-CHIP

CROSS-REFERENCE TO RELATED APPLICATIONS

This application claims the benefit of U.S. Provisional Patent No. 62/664,661, filed Apr. 30, 2018. The content of the provisional application is hereby incorporated by reference in its entirety.

TECHNICAL FIELD

The teachings of the present disclosure relate generally to system-on-chip (SoC) integrated circuit design, and in certain aspects, to a pre-boot environment for a SoC.

INTRODUCTION

Computing devices are ubiquitous. Some computing devices are portable, such as mobile phones, tablets, and laptop computers. As the functionality of such portable computing devices increases, the computing or processing power required and, generally, the data storage capacity to support such functionality also increases. In addition to the primary function of these devices, many include elements that support peripheral functions. For example, a cellular telephone may include the primary function of enabling and supporting cellular telephone calls and the peripheral functions of a still camera, a video camera, global positioning system (GPS) navigation, web browsing, sending and receiving emails, sending and receiving text messages, push-to-talk capabilities, etc. Many of these portable devices include a system-on-chip (SoC) to enable one or more primary and peripheral functions on the specific device.

A SoC generally includes multiple central processing unit (CPU) cores embedded in an integrated circuit or chip and coupled to a local bus. The CPU cores may further be arranged into or more computing clusters. The SoC may further generally include hardware components and other processors. For example, a SoC may include one or more CPUs, CPUs with multiple cores, one or more digital signal processors, etc. grouped into one or more subsystems.

The SoC, like larger computing devices such as desktop and server computers, relies on a boot sequence or a boot code upon powering up. The boot sequence is the initial set of operations that the SoC performs when power is first applied to the SoC. The boot code enables a (e.g., bootstrapping) process that initializes and boots the SoC (e.g., to run an operating system (OS)). The boot code is typically stored in a read-only memory (ROM) for quick access, low complexity, spatial efficiency, low cost, and security reasons.

The boot sequence may utilize internal memory (e.g., on-chip memory that is on the same chip as the SoC, such as static random-access memory (SRAM)) and complex drivers to securely boot the SoC, as well as external memory (e.g., off-chip memory that is off the same chip as the SoC, including dynamic random access memory (DRAM), such as double data rate (DDR) synchronous DRAM (SDRAM), low power DDR (LPDDR), etc.) such as to save costs on the amount of internal memory used when the SoC has more functionality that requires more memory to boot. The external memory may be stacked with the SoC (e.g., application processor, modem chip, etc.), may be configured as a package on package design, may be completely external (e.g., not on the same package as the SoC), etc.

As part of the boot sequence, to boot each of or group of the hardware components and other processors of the SoC, there may be a chain of bootloaders and handoff secure executables (e.g., firmware executables, etc., also referred to as firmware images). In particular, each of the hardware components and other processors of the SoC may need to be booted (e.g., securely booted) using a firmware image for the particular hardware component. A chain loading method may be used to boot the various hardware components of the SoC by executing each of the firmware images. The greater the number of hardware components on the SoC, the greater the number of firmware images for the SoC that need to be executed. Accordingly, the boot time of the SoC (e.g., for secure and non-secure boot of components) is a function of the number of firmware images.

In addition, the boot of one or more of the hardware components may be secured, such as to meet requirements in certain applications for strong integrity check, authentication, or other security algorithms, to ensure that the firmware images have not been tampered with or corrupted, and originate from the intended party. Accordingly, the SoC may implement hashing algorithms (e.g., SHA256, SHA384, SHA512, etc.), encryption algorithms (e.g., AES variants), and/or digital signature algorithms (e.g., RSA 2K, RSA 4K, ECC P384, etc.) for checking the integrity and authentication of the firmware images. Further, even when secure boot is not enabled, hashing algorithms may still be used to enforce integrity check of firmware images, such as when booting from flash media or a flashless interface or interconnect (e.g., USB, PCIe, etc.). These various algorithms may be implemented in hardware or in software on the SoC, and due to computational complexity, may result in increased boot time of the SoC. The greater the number of firmware images, the more times such algorithms are run on the firmware images, thus increasing boot time.

In certain scenarios, a SoC may have certain boot time key performance indicator (KPI) metrics to meet. For example, certain components of the SoC may need to boot within certain time periods (e.g., ~500 ms) to meet the KPI (e.g., power on to first sign of life, power on to splash screen on display, power on to OS home screen, power on to when modem or WiFi or other subsystem is booted and ready to connect to a network, power on to car rear camera up, secure boot counterparts, etc.). As the number of components on the SoC grows, meeting the KPI may become difficult. Accordingly, there is a need to reduce SoC boot time.

Unified Extensible Firmware Interface (UEFI) is a specification that defines a software interface between an OS and the hardware platform (e.g., SoC) that the OS executes on. For example, UEFI differentiates between a pre-boot environment (e.g., before an OS is executing on the SoC) and a post-boot environment where the OS is executing on the SoC. This allows an OS to be designed in a hardware agnostic manner, as the software interface creates the interface between the OS and the SoC. The UEFI specification, along with a platform initialization (PI) specification define a pre boot environment (e.g., before the boot process is complete and the OS fully running) including the chain of boot phases for a SoC (e.g., a Security (SEC) phase, a Pre-EFI Initialization phase (PEI), a Driver eXecution Environment (DXE) Phase, a Boot Device Selection (BDS) Phase, an OS Loader phase, etc.). The pre-boot environment may be implemented by loading and executing at the SoC a firmware image that enables the pre-boot environment. The pre-boot environment may provide certain drivers, framework, protocols, and interfaces and also allows certain applications to run on the SoC in the pre-boot environment.

For example, a boot manager application (e.g., OS loader) may be executed in the pre-boot environment that loads the OS. Other applications may also be run in the pre-boot environment, such as applications that test and verify functionality of CPU cores, memory, etc.; applications that program (e.g., at the factory) firmware images to the SoC (e.g., via fastboot); etc.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In some aspects, the present disclosure provides a method of enabling a multithread framework in a pre-boot environment for a system-on-chip (SoC) including one or more computing cores. The method includes providing a scheduler to schedule running of a plurality of threads on the one or more computing cores in the pre-boot environment, the plurality of threads comprising a core thread configured to provide a plurality of services and one or more additional threads. The method further includes providing, by the scheduler, a first lock for the core thread. The method further includes initializing, by the core thread, one or more additional services separate from the plurality of services. The method further includes selectively allowing access to the plurality of services of the core thread to the one or more additional threads based on a status of the first lock. The method further includes allowing access to the one or more additional services to the one or more additional threads independent of the status of the first lock.

In some aspects, the present disclosure provides a system-on-chip (SoC) including a memory and one or more computing cores coupled to the memory. The one or more computing cores are configured to provide a scheduler to schedule running of a plurality of threads on the one or more computing cores in a pre-boot environment, the plurality of threads comprising a core thread configured to provide a plurality of services and one or more additional threads. The one or more computing cores are further configured to provide, by the scheduler, a first lock for the core thread. The one or more computing cores are further configured to initialize, by the core thread, one or more additional services separate from the plurality of services. The one or more computing cores are further configured to selectively allow access to the plurality of services of the core thread to the one or more additional threads based on a status of the first lock. The one or more computing cores are further configured to allow access to the one or more additional services to the one or more additional threads independent of the status of the first lock.

In some aspects, the present disclosure provides a non-transitory computer readable storage medium that stores instructions that when executed by a system-on-chip (SoC) comprising one or more computing cores cause the SoC to perform a method of enabling a multithread framework in a pre-boot environment. The method includes providing a scheduler to schedule running of a plurality of threads on the one or more computing cores in the pre-boot environment, the plurality of threads comprising a core thread configured to provide a plurality of services and one or more additional threads. The method further includes providing, by the scheduler, a first lock for the core thread. The method further includes initializing, by the core thread, one or more additional services separate from the plurality of services. The method further includes selectively allowing access to the plurality of services of the core thread to the one or more additional threads based on a status of the first lock. The method further includes allowing access to the one or more additional services to the one or more additional threads independent of the status of the first lock.

In some aspects, the present disclosure provides a system-on-chip (SoC). The SoC includes means for providing a scheduler to schedule running of a plurality of threads on one or more computing cores in a pre-boot environment, the plurality of threads comprising a core thread configured to provide a plurality of services and one or more additional threads. The SoC includes means for providing, by the scheduler, a first lock for the core thread. The SoC includes means for initializing, by the core thread, one or more additional services separate from the plurality of services. The SoC includes means for selectively allowing access to the plurality of services of the core thread to the one or more additional threads based on a status of the first lock. The SoC includes means for allowing access to the one or more additional services to the one or more additional threads independent of the status of the first lock.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Although the teachings of this disclosure are illustrated in terms of integrated circuits (e.g., a SoC), the teachings are applicable in other areas. The teachings disclosed should not be construed to be limited to SoC designs or the illustrated embodiments. The illustrated embodiments are merely vehicles to describe and illustrate examples of the inventive teachings disclosed herein. Further, though certain techniques for loading firmware images for boot are described with respect to external memory, similar techniques may be used for loading firmware images for boot from other components such as over high speed devices/interfaces.

Figure 1:
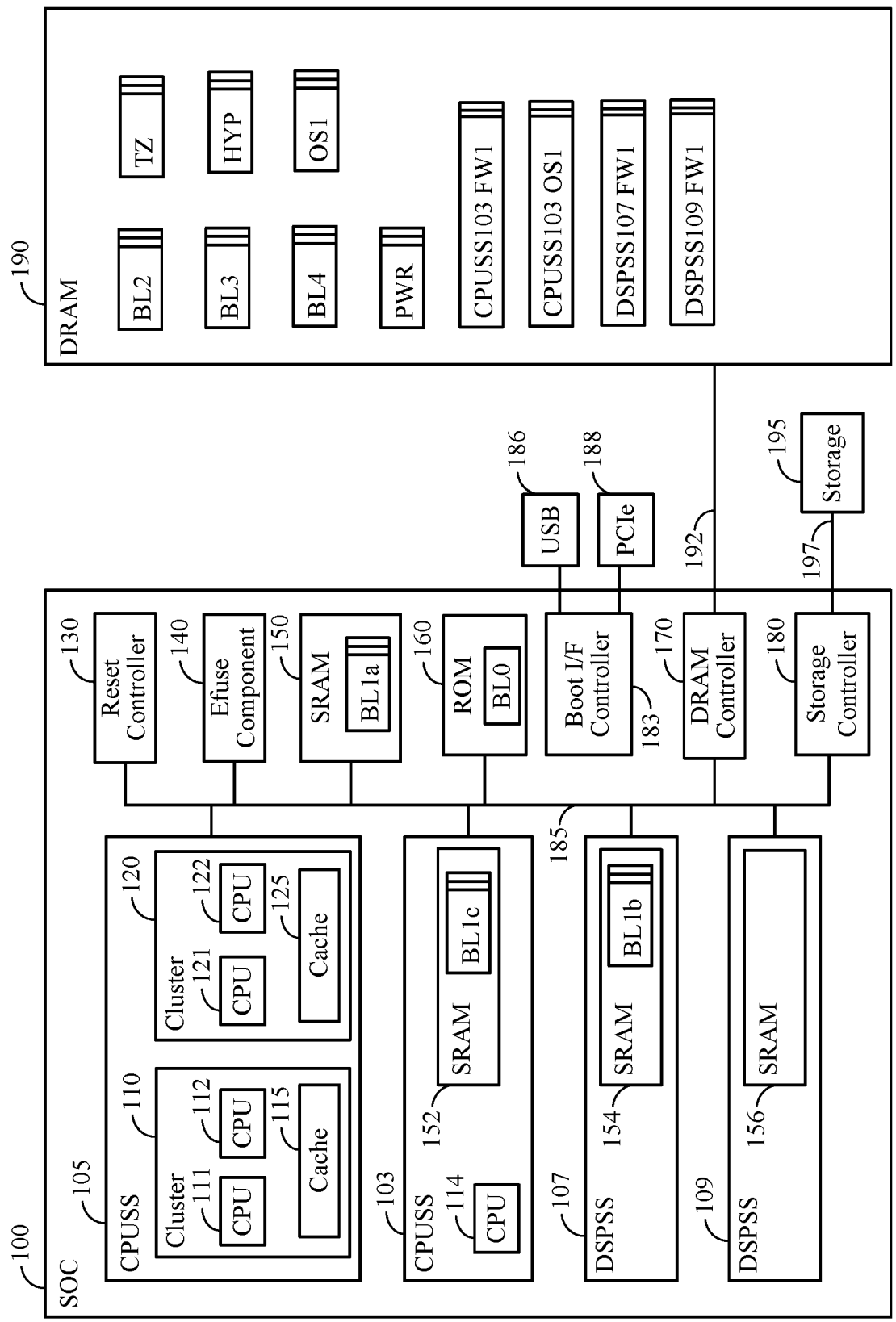
FIG. 1 is a simplified schematic diagram of a system-on-chip (SoC), in accordance with certain aspects of the present disclosure.

FIG. 1 a simplified schematic diagram of an exemplary SoC 100, in accordance with certain aspects of the present disclosure. The SoC 100 may be interconnected to other chips by one or more chip-to-chip interfaces such as peripheral component interconnect express (PCIe), universal serial bus (USB), serial peripheral interface (SPI), etc. In certain aspects, one of the one or more chip-to-chip interfaces may be used for booting the SoC 100.

As shown, the SoC 100 includes a CPU sub-system (CPUSS) 105. The CPUSS 105 includes a plurality of CPU cores 111, 112, 121, and 122. Though CPUSS 105 is shown with a particular number of CPU cores, it should be noted that there may be additional or fewer cores in CPUSS 105. Further, CPU cores 111 and 112 are part of a cluster 110, and CPU cores 121 and 122 are part of a cluster 120. Again, though shown with a particular number of CPU clusters, CPUSS 105 may include additional or fewer clusters. Further, each cluster may include the same or a different number of CPU cores. The CPU cores of a given cluster (e.g., CPU cluster 110 or 120) may be of the same type, or may be of different types (e.g., in-cluster big.LITTLE design, cluster based big.LITTLE design, etc.). A big.LITTLE design may refer to a computing architecture that includes low power, slower processor cores (e.g., LITTLE) that provide battery-savings along with high power, faster processor cores (e.g., big) that provide better processing performance.

Further, the CPUSS 105 may include CPU resources, such as one or more caches. As shown, each cluster 110 and 120 includes a cache 115 and 125, respectively. In certain aspects, the CPU cores of the clusters 110 and 120 may share the cache 115 and 125, respectively, for memory storage. It should be noted that the CPUSS 105 may include additional or different CPU resources than those shown. For example, in some aspects, one or more CPU cores may have its own associated cache, one or more clusters may have its own associated cache (e.g., shared by CPU cores of the cluster), and/or the CPUSS 105 may include one or more caches shared by one or more clusters and/or CPU cores. The SoC 100 further may include additional CPUSS 103, and one or more digital signal processor subsystems (DSPSS) such as DSPSS 107 and DSPSS 109. In certain aspects, each of CPUSS 103, DSPSS 107, and DSPSS 109 may have its own SRAM 152, 154, and 156, respectively, functioning as (e.g., in lieu of) a cache for reading and writing data. CPUSS 103 is shown as having a single CPU core 114, but may include additional cores, caches, etc.

The SoC 100 further includes a reset controller 130, an efuse component 140, static random-access memory (SRAM) 150, a read only memory (ROM) 160, a dynamic RAM (DRAM) controller 170, a storage controller 180, and boot interface (I/F) controller 183, which are all shown as internal (e.g., on-chip) components of the SoC 100. The internal components of the SoC 100 are coupled together by a bus 185. Further, the DRAM controller 170 is coupled to a DRAM 190, which is external (e.g., off-chip) to the SoC 100, by a bus 192. A physical implementation of the DRAM 190 may be stacked with the SoC 100, may be configured as a package on package design, may be completely external (e.g., not part of the same package as the SoC 100), etc. The storage controller 180 is coupled to a storage 195 (e.g., flash storage) external (e.g., off-chip) to the SoC 100 by a bus 197. The SRAM 150, DRAM 190, and storage 195 may provide storage capacity for the SoC 100 in addition to caches 115 and 125.

In some aspects, the reset controller 130, during system boot, is configured to release a CPU core of the CPUSS 105 from reset. In some aspects, the CPU core released is then configured to begin executing code/data (e.g., boot code), such as ROM bootloader BL0 as shown, from the ROM 160 to begin booting the SoC 100. The ROM 160 (e.g., boot ROM) is an integrated circuit that includes the code or codes (e.g., boot code) that are executed by the CPUSS 105 during an initial power-on or upon a watchdog reset condition (e.g., after a malfunction of SoC 100 that is detected by a timer on SoC 100 not being reset or "timing out"). In some aspects, the ROM is enabled in firmware. In some aspects, the CPUSS 105 boots (e.g., securely) from storage 195, by running executables, data images, etc. stored in storage 195 for booting the SoC 100, including the various hardware components of the SoC 100. For example CPUSS 105 loads the firmware images into DRAM 190 from storage 195 for execution. In some aspects, the CPUSS 105 boots (e.g., securely) from a transport layer instead of a storage (e.g., a flashless transport layer). For example, the CPUSS 105 may boot from the transport layer, by loading firmware images booting the SoC 100 received over the transport layer into DRAM 190 for execution. In particular, SoC 100 may utilize boot I/F controller 183 to communicate with another component (e.g., another SoC) over a chip-to-chip interface. For example, boot I/F controller 183 of SoC 100 may control a chip-to-chip interface (e.g., transport layer) of SoC 100 such as PCIe 188 or USB 186 to communicate with a chip-to-chip interface of another component. Accordingly, SoC 100 may communicate over a transport layer via boot I/F controller 183.

In certain aspects, CPUSS 105 boots securely by checking the integrity of firmware images used for boot prior to execution of the firmware images (e.g., using a cryptographic signature protocol, chain of trust, authentication tags, checksums, etc.).

In certain aspects, the CPUSS 105 is configured to boot by running firmware images shown as loaded in DRAM 190, SRAM 150, SRAM 152, SRAM 154, and SRAM 156. For example, the CPUSS 105 executes ROM bootloader BL0 from ROM 160. The ROM bootloader BL0 causes the CPUSS 105 to execute bootloader BL1a in SRAM 150. Bootloader BL1a may initialize DRAM controller 170 and DRAM 190. In certain aspects (e.g., in a boot configuration from flash storage), bootloader BL1a also initializes storage controller 180 and storage 195, and causes CPUSS 105 to load the firmware images into DRAM 190 from storage 195 for execution. In certain aspects (e.g., in a flashless boot configuration), instead of initializing storage controller 180 and storage 195, bootloader BL1a also initializes boot I/F controller 183, and causes CPUSS 105 to load the firmware received over the transport layer into DRAM 190 for execution. Accordingly, the SoC 100 can access firmware images from DRAM 190. BL1a may further boot the SoC 100 by controlling execution of additional firmware images, such as bootloaders BL2, BL3, and BL4, TZ (e.g., secure world firmware), HYP (e.g., hypervisor firmware), and OS1 (e.g., operating system) on the application processor (e.g., CPUSS 105) subsystem. Further, in certain aspects, other subsystem firmware images booted during the boot process include PWR (e.g., power firmware), CPUSS103 FW1 (e.g., CPUSS 103 firmware), CPUSS103 OS1 (e.g., CPUSS 103 operating system), DSPSS107 FW1 (e.g., DSPSS 107 firmware), and DSPSS109 FW1 (e.g., DSPSS 109 firmware). In certain aspects, BL1a may further boot the SoC 100 by controlling execution of additional firmware images by other subsystems, such as BL1b by DSPSS 107 and BL1c by CPUSS 103. In certain aspects, certain early firmware images are booted by BL1a, and the remaining firmware images are booted by an operating system such as OS1.

Conventionally, the execution of each of BL0, BL1a, BL2, BL3, and BL4 is performed on a single core (e.g., CPU core 111) of CPUSS 105 and each is run as a single thread, and an operating system, such as the kernel of OS1, is the first firmware image executed on the SoC 100 that enables a scheduler to enable multi-thread and multi core optimizations to allow multiple CPU cores of CPUSS 105 to execute additional firmware images during boot and/or allow processes to be executed as separate threads that run on one or more CPU cores of CPUSS 105. For example, BL2 and BL3 may implement and enable a pre-boot environment (e.g., as defined by the UEFI specification), and BL4 may be a boot manager that loads the OS.

Figure 2:
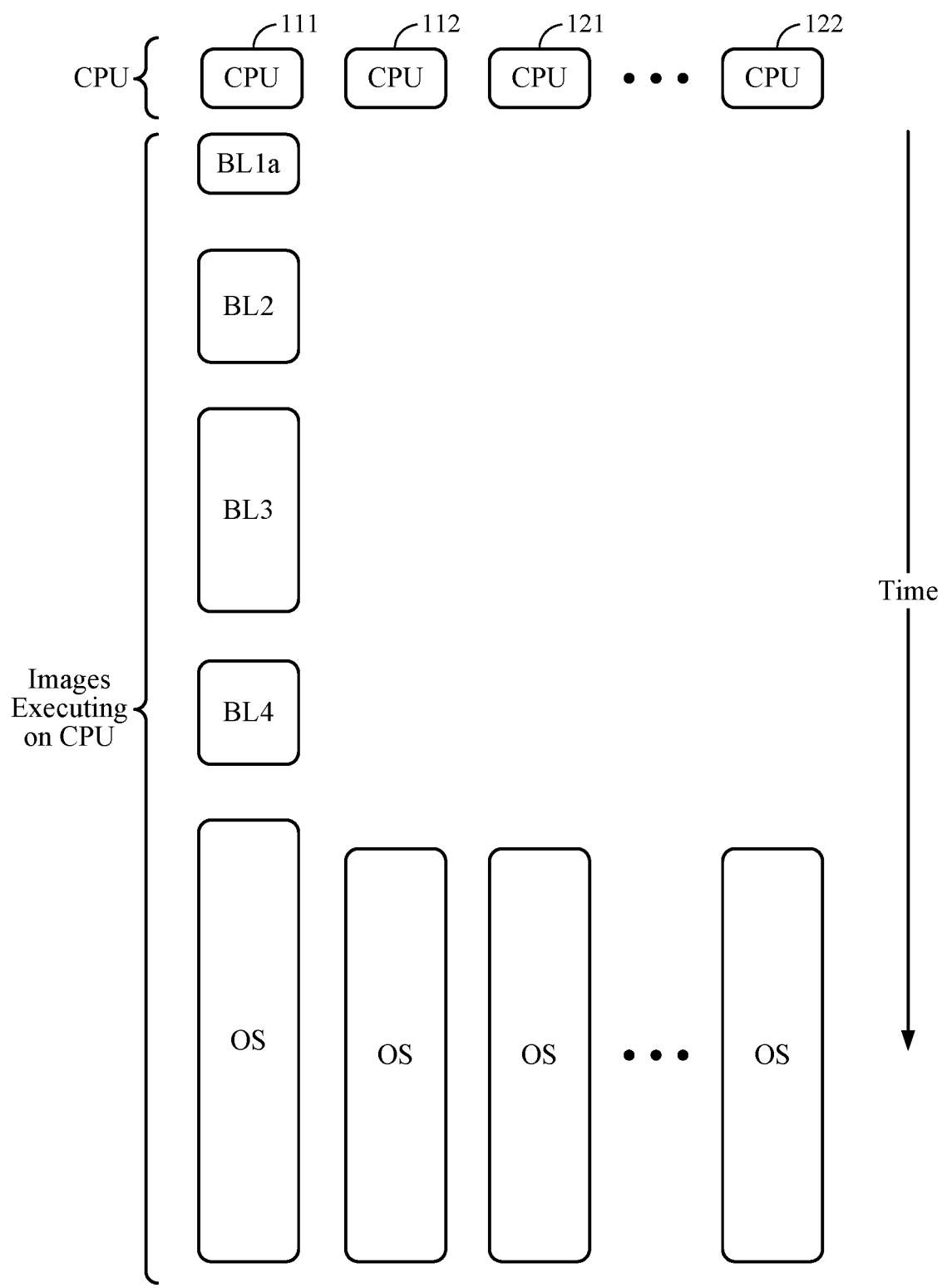
FIG. 2 is a block diagram illustrating an example conventional bootup of a SoC where only a single core is enabled in the pre-boot environment and the pre-boot environment supports execution of only a single thread on the single core.

FIG. 2 is a block diagram illustrating an example conventional bootup of SoC 100 where only a single core is enabled in the pre-boot environment and the pre-boot environment supports execution of only a single thread on the single core. In FIG. 2, CPU core 111 (e.g., as initialized by BL0) executes BL1a running as a single thread. CPU core 111 further executes BL2, BL3, and BL4 each running as a single thread at a time. As shown, only once an OS begins executing can the OS schedule execution of code (e.g., firmware images) on other cores such as CPU cores 112, 121, and 122. Further, the code executing on each of the CPU cores 111-122 may execute as multiple threads on each of the CPU cores 111-122.

It should be noted that in certain aspects, there may be more or fewer bootloaders. Further, it should be noted that more or fewer of the bootloaders may map to boot stages that implement and enable a pre-boot environment (e.g., as defined by the UEFI specification). For example, all of BL0, BL1a, BL2, BL3, and BL4 may implement and enable a pre-boot environment.

Figure 3:
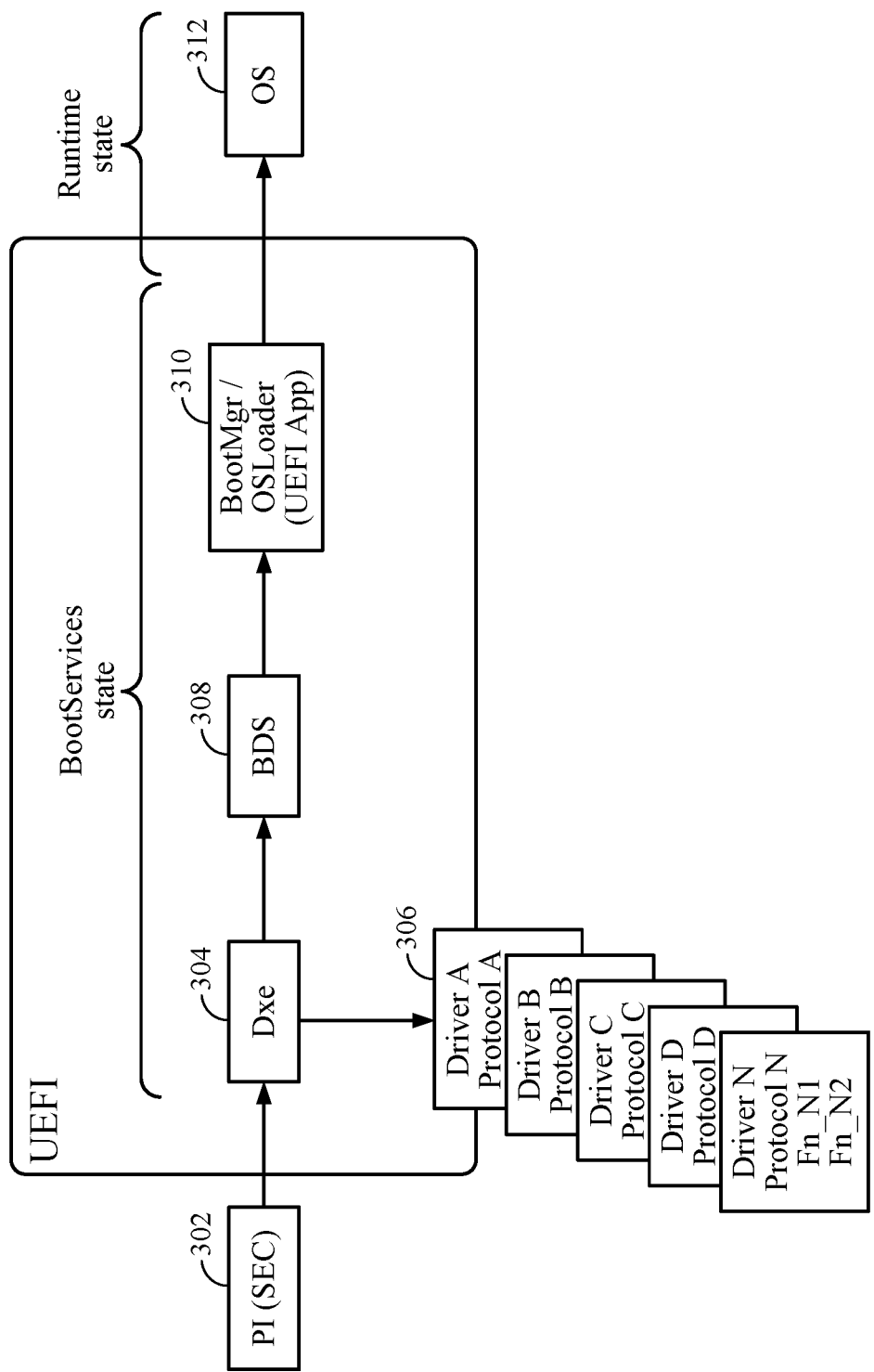
FIG. 3 is a block diagram that illustrates example boot phases (e.g., stages) for a SoC.

FIG. 3 is a block diagram that illustrates example boot phases (e.g., stages) for a SoC. In certain aspects, FIG. 3 illustrates a chain of example boot phases defined in the UEFI specification and a PI specification that define a pre boot environment. Each boot phase may correspond to a separate image that is loaded and run on a CPU core (e.g., CPU core 111) of the SoC 100 to perform the functions of the boot phase. These images may correspond to or be included in the BL3 firmware image. A first boot phase in the chain is shown as PI (e.g., SEC) 302, which is loaded first on SoC 100. PI 302 is configured to perform platform/target/architecture dependent initialization.

PI 302 provides the initialization information to the next boot phase DXE 304. DXE 304 is configured to enable the use of driver services in the pre-boot environment. For example, DXE 304 includes a core image (e.g., DxeCoreImage) that provides platform/target/architecture independent capabilities. DXE 304 is configured to load external images 306 (e.g., from an external storage, interface, etc.) such as driver images, each corresponding to a driver service, which provide platform/target/architecture dependent capabilities and services. These driver services can then be made available to any application that is launched and executed on computing cores of SoC 100 in the pre-boot environment.

After the driver images 306 are loaded, boot of SoC 100 continues with the loading and execution of BDS 308. At execution of BDS 308 all drivers are loaded and initialized at the SoC 100. Further, the complete pre-boot environment system and protocol services are functional. BDS 308 is configured to process boot options based on persistent settings in environment variables. Further, BDS 308 may be configured to launch applications 310, such as an OS loader application, any verification applications, etc., to continue booting SoC 100. Continuing, an application 310 may load and launch an OS 312 on SoC 100. Though certain examples are shown with respect to a UEFI environment and UEFI applications, the techniques may similarly be applicable to other suitable environments and applications.

One limitation of the UEFI specification, which is also a limitation of most conventional bootloaders or pre-boot environments such as Uboot, coreboot, etc., is that it is limited to using a single CPU core of a SoC executing a single thread on the single CPU core. For example, applications run in the pre-boot environment may be limited to using a single CPU core of the SoC and execute as a single thread, and boot of the SoC may only occur using a single CPU core of the SoC running a single thread. This may slow down boot time, and impact performance of processes performed in the pre-boot environment, such as verification processes and factory programming processes for the SoC.

Figure 3A:
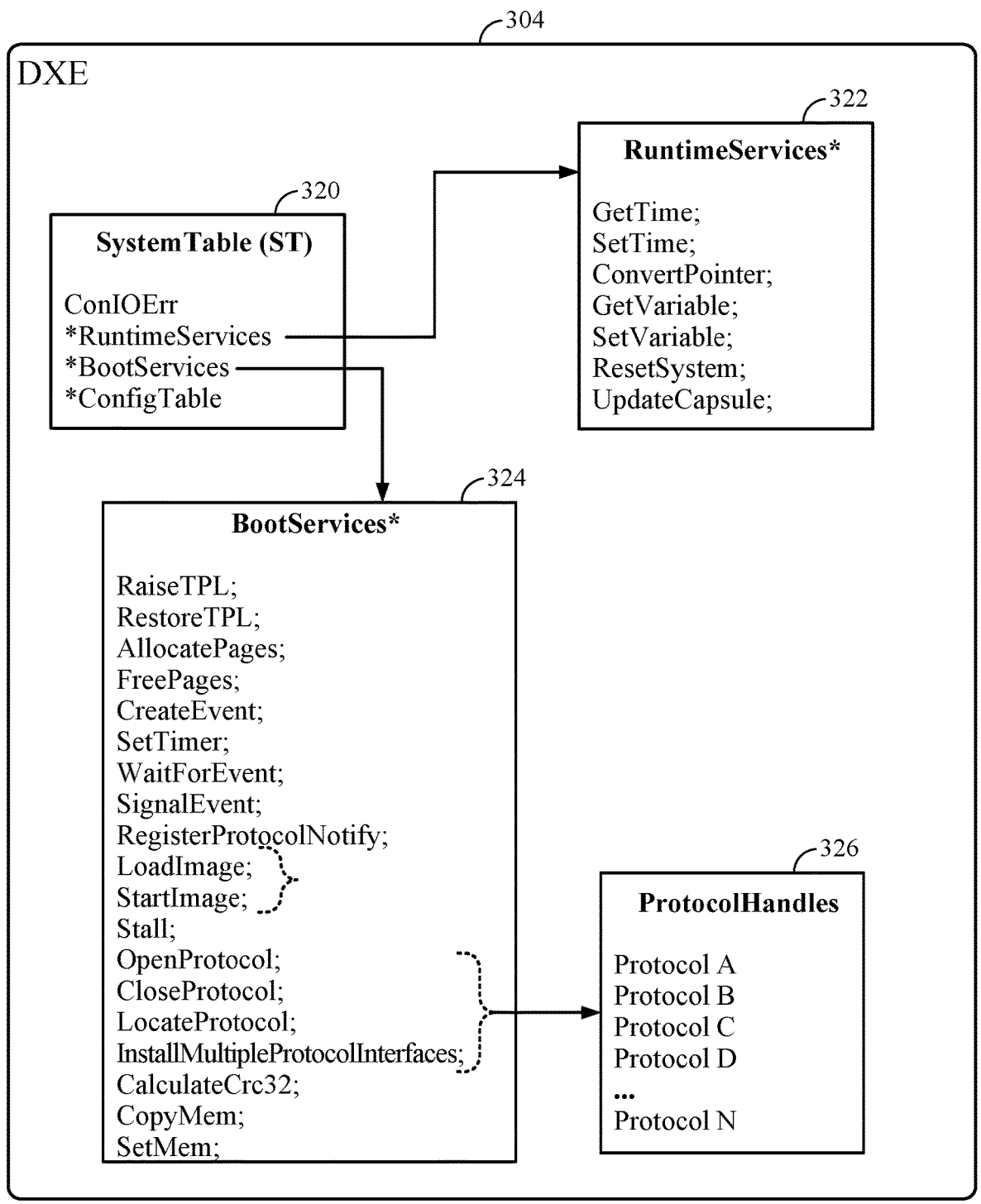
FIG. 3A illustrates a block diagram of an example DXE in accordance with certain aspects.

FIG. 3A illustrates a block diagram of an example DXE 304 in accordance with certain aspects. In particular, FIG. 3A illustrates certain functions of DXE 304. As shown, DXE 304 includes a system table (ST) 320. ST 320 acts as a gateway to all the services offered by DXE 304 by providing certain application programming interfaces (APIs) to allow other code/functions/applications/images executing on SoC 100 to request the services. As shown, ST 320 provides runtime services 322 and boot services 324. In certain aspects, the runtime services 322 and boot services 324 are available within the pre-boot environment. In certain aspects, the runtime services 322 are further available to an OS executing in a post-boot environment.

DXE 304 may provide a pointer to ST 320 to external images (e.g., driver images) so that the external images can utilize the services of ST 320 (e.g., boot services 324). The driver images may initialize hardware and install their driver services in ST 320 (e.g., as part of boot services 324) using protocol APIs of boot services 324. The driver services may be installed as protocol handles 326 in boot services 324 that can be requested/opened to provide the services offered by the driver images.

In addition, certain DXE 304 services rely on certain hardware resources such as CPU core, memory management unit (MMU), and timer related resources, interrupt handlers, and memory. Accordingly, DXE 304 may be configured to manage access to (e.g., own) these hardware resources (e.g., the drivers of the hardware resources). Therefore, DXE 304 may support timers, event notifications, etc. based on managing access to the hardware resources.

Conventionally, multithread execution in the pre-boot environment, whether on a single core or multiple cores, may not be possible due to the lack of good locking/synchronization functionality in the pre-boot environment to schedule and execute multiple threads. For example, UEFI defines a task priority list (TPL). TPL allows code for execution to be queued in the background and then a callback can be used to execute queued code, basically acting as a callback based priority function. Such TPL functionality is very limited and does not provide proper multithreading support. For example, implementing non-blocking calls using such TPL functionality would be prohibitively complex and CPU inefficient.

Given that UEFI is a single threaded environment conventionally, only one driver service can be utilized at a time. For example, as discussed, the pre-boot environment may install multiple driver services for use in the pre-boot environment. Therefore, when any one driver service is being utilized/executed, no other driver service can be utilized, making the use of driver services sequential in nature, even if the driver services do not have dependencies between one another. This can make execution in the pre-boot environment slower and less efficient.

In addition, if a particular driver service (e.g., display driver service) is configured to wait for a hardware settling time before completing execution, the boot process is slowed until the driver service completes execution.

Accordingly, conventional pre-boot environments can have long boot times, low CPU core use efficiency, etc. These can affect performance and efficiency such as during testing of a SoC in a factory setting.

In order to overcome such limitations of only being able to use a single thread on a single core in the pre-boot environment, in certain aspects, the kernel of the operating system may be started more quickly by executing the firmware image for the operating system (OS1) earlier in the boot process. For example, the number of bootloader stages (e.g., corresponding to bootloader firmware images BL0, BL1a, BL2, BL3, BL4, etc.) during boot may be reduced. However, reducing the number of bootloader stages still utilizes a complex kernel dependency to enable the use of multiple CPU cores during boot, meaning the use of multiple CPU cores is dependent on the operating system.

Accordingly, certain aspects herein relate to enabling the use of multiple threads (e.g., on one or more CPU cores of a single CPUSS and/or CPU cores of multiple CPUSSs of a SoC) in a pre-boot environment. In certain aspects, the use of multiple threads may be enabled at the loading of the BL3 firmware image. Such aspects beneficially can reduce boot time, increase efficiency of execution of images, drivers, and applications in a pre-boot environment, allow for faster programming of a SoC in a factory, allow for testing/verification/stressing of the SoC in the pre-boot environment, etc., while maintaining backwards compatibility with conventional pre-boot environment frameworks, such as UEFI.

Figure 4:
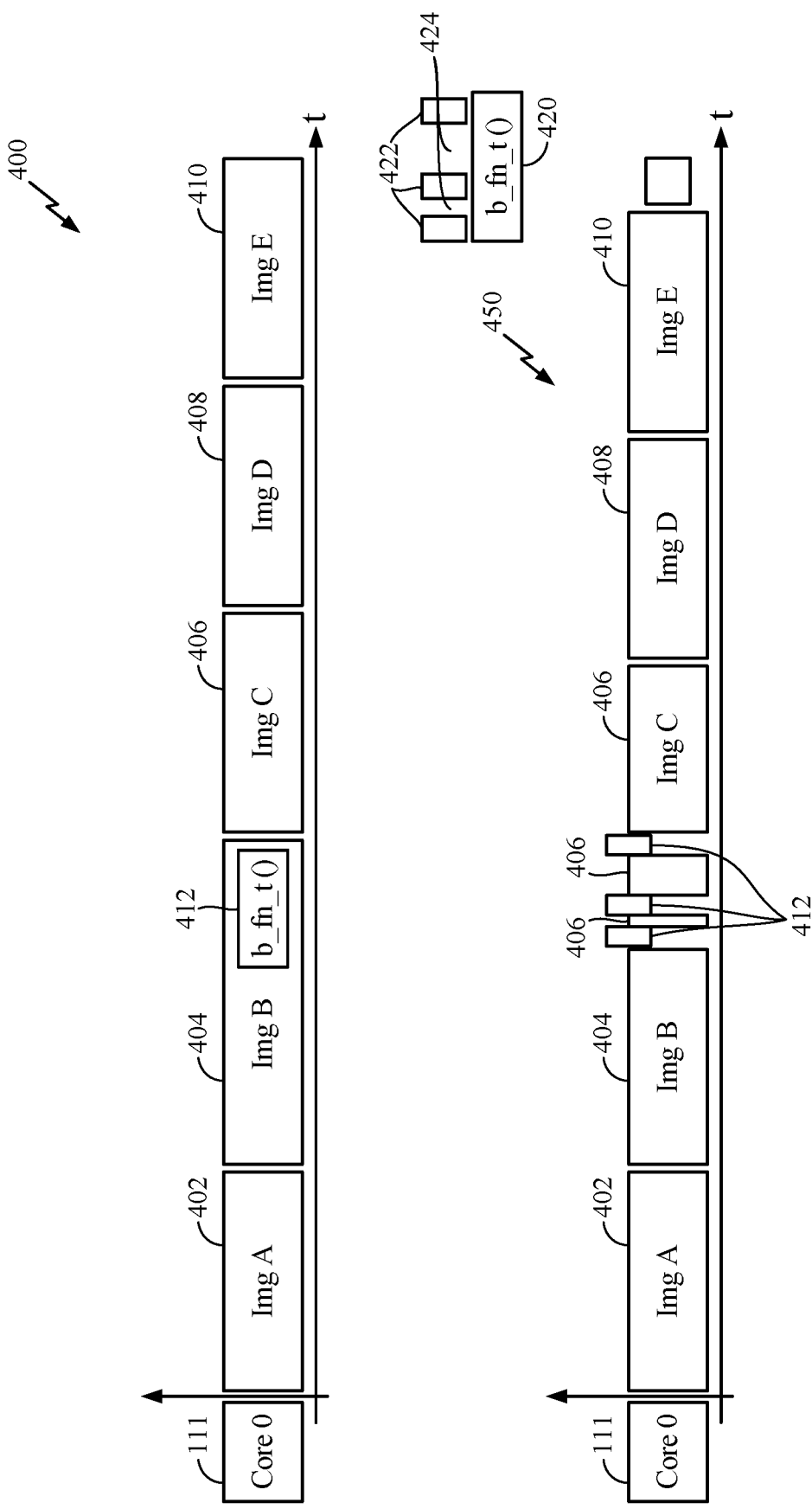
FIG. 4 shows timelines that illustrate how multithreading can increase efficiency on a single core in a pre-boot environment.

FIG. 4 shows timelines that illustrate how multithreading can increase efficiency on a single core in a pre-boot environment. Timeline 400 illustrates execution of images in a conventional pre-boot environment that does not support multithreading. Timeline 450 illustrates execution of images in a multithreaded pre-boot environment according to aspects described herein.

As shown in timeline 400, multiple images 402-410 are executed in serial on CPU core 111. These images 402-410 may correspond to different drivers loaded in the pre-boot environment. As shown, image 404 includes a function 412 for execution on CPU core 111. In certain aspects, function 412 is a non-CPU intensive function (e.g., a display panel initialization function), meaning that the CPU core 111 may have one or more extended sleep periods when executing function 412. For example, function 412 may execute over an overall time period 420. However, CPU core 111 may only be active during time periods 422, and may be inactive or sleep during time periods 424. Without multithreading, as shown, CPU core 111 cannot be used to execute any other code during time periods 424, even though CPU core 111 is not in use, which is inefficient.

In contrast, as shown in timeline 450, using multithreading, other code (e.g., corresponding to other images) can be executed as a separate thread than a thread of function 412 (e.g., a thread of image 404) during time periods 424. For example, as shown, code/functions of image 406 may be executed during time periods 424 so that CPU core 111 is utilized during time periods 424, thereby decreasing boot time, and increasing CPU utilization efficiency.

Figure 5:
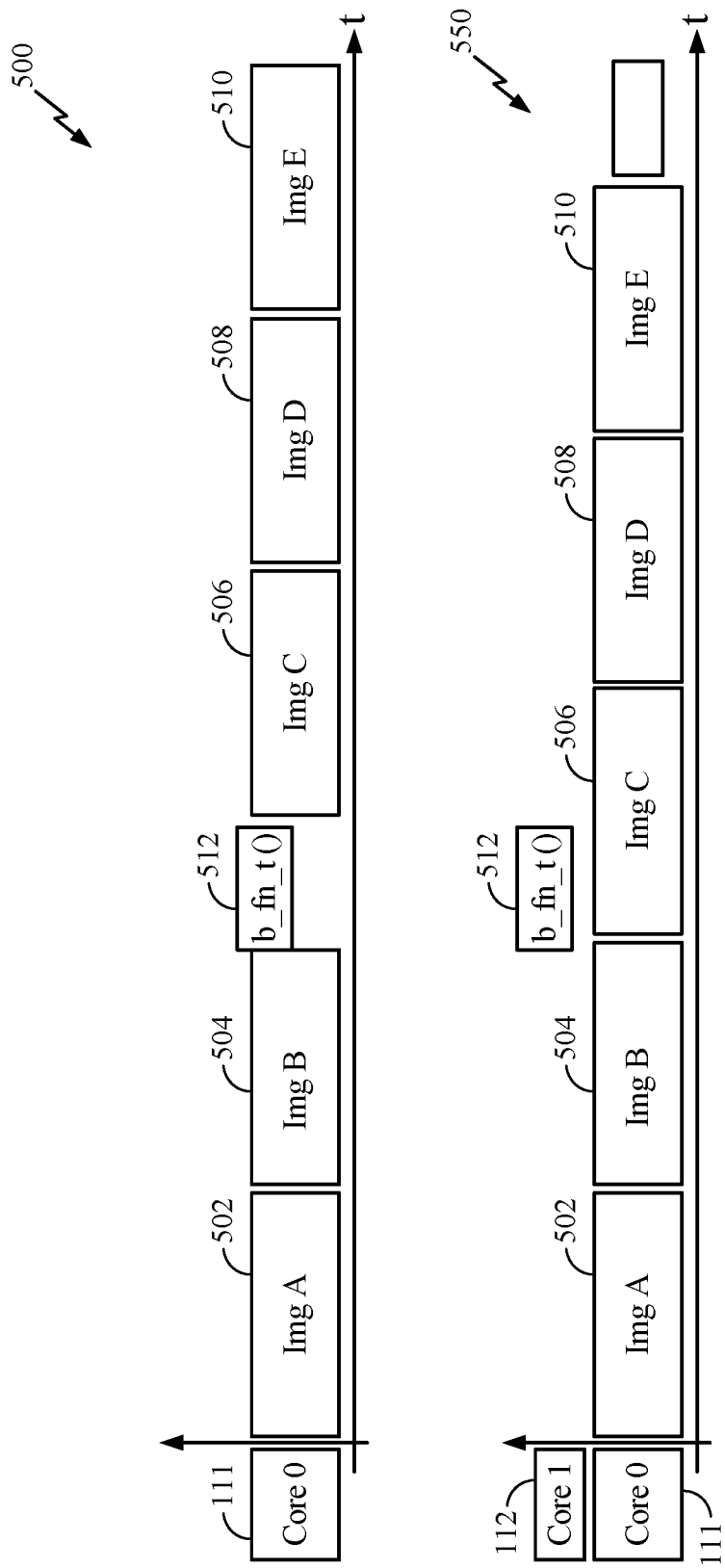
FIG. 5 shows timelines that illustrate how multithreading can increase efficiency on a multiple cores in a pre-boot environment.

FIG. 5 shows timelines that illustrate how multithreading can increase efficiency on a multiple cores in a pre-boot environment. Timeline 500 illustrates execution of images in a conventional pre-boot environment that does not support multithreading. Timeline 550 illustrates execution of images in a multithreaded pre-boot environment according to aspects described herein.

As shown in timeline 500, multiple images 502-510 are executed in serial on CPU core 111. These images 502-510 may correspond to different drivers loaded in the pre-boot environment. As shown, a function 512 is executed on CPU core 111. In certain aspects, function 512 is a CPU intensive function, meaning that the CPU core 111 may be active for most of the duration of execution of function 512. However, another CPU core, such as CPU core 112, may not be active during execution of function 512. Without multithreading, as shown, CPU core 112 cannot be used to execute any other code during the execution of function 512, even though CPU core 112 is not in use, which is inefficient.

In contrast, as shown in timeline 550, using multithreading, other code (e.g., corresponding to other images) can be executed as a separate thread than a thread of function 512 on a different CPU core than function 512. For example, as shown, code/functions of image 506 may be executed on CPU core 111, while function 512 is instead executed in parallel on CPU core 112 so that both CPU core 111 and 112 are utilized during execution of function 512, thereby decreasing boot time, and increasing CPU utilization efficiency. It should be noted that function 512 need not be a CPU intensive function in this example and may even be a non-CPU intensive function whereby CPU core 112 may additionally be used to execute other code during sleep periods of function 512.

Certain aspect herein relate to enabling the use of multiple threads (e.g., on one or more CPU cores of a single CPUSS and/or CPU cores of multiple CPUSSs of a SoC) in a pre-boot environment by providing a multithreading framework. In certain aspects, the multithreading framework defines a boundary (e.g., referred to as DXE boundary) that defines portions of DXE that are within the DXE boundary and that execute single threaded, e.g., referred to as the DXE core and corresponding to the DXE core image, and portions of the DXE implementation (e.g., utilized by driver services and applications) that can be multithreaded, e.g., referred to as outside the DXE boundary. In certain aspects, the multithreading framework further provides a scheduler in the pre-boot environment. In certain aspects, the multithreading framework further defines a separation in hardware resource ownership between the DXE core and the scheduler. In certain aspects, the multithreading framework further provides virtual hardware services and framework initialization and setup.

In certain aspects, code within the DXE boundary includes any public APIs implemented by the DXE core image and any APIs implemented by external images (e.g., driver images) that are used by the DXE core image (e.g., memory related services, timers, interrupts, etc.). In certain aspects, APIs implemented by external images not used by the DXE core image and other images are outside the DXE boundary. In certain aspects, any image that launches through an entry point and notification callback functions of external images are outside the DXE boundary and can be multithreaded.

In certain aspects, any transitions over the DXE boundary, meaning transitioning from code executing within the DXE boundary to code executing outside the DXE boundary or vice versa, are serialized to ensure that the DXE operates as intended by simulating a single execution context to the DXE core from multiple threads outside the DXE boundary. In certain aspects, a scheduler is configured to provide locks for entry/exit across the DXE boundary to provide such serialization.

In certain aspects, the multithreading framework provides a scheduler (e.g., symmetric multi-processor (SMP) scheduler) that runs on SoC 100. In certain aspects, both the scheduler and DXE core run on the same CPU core (e.g., CPU core 111). In certain aspects, the schedule and DXE core run on different CPU cores. In certain aspects, the scheduler uses synchronization primitives for the threads. In certain aspects, the scheduler is configured to provide certain services such as timer, events, recursive mutex, and thread affinity to CPU cores.

In certain aspects, the scheduler manages access to/owns CPU context resources, meaning the scheduler handles the context for all the threads running on SoC 100, which may be required for context switching between threads. Further, in certain aspects, the scheduler owns all exception handlers and handles all exceptions on all CPU cores of the SoC 100. In certain aspects, the scheduler owns all interrupt handlers (e.g., timer interrupt handlers) and handles dispatching all interrupts of the SoC 100. In certain aspects, the scheduler owns all timer handlers and handles timer match value programming of the SoC 100 for scheduling/pre-emption.

In certain aspects, the DXE core owns memory resources so it can provide allocation services, memory type configuration, define memory mapping for the OS, runtime virtual address handling, etc. In certain aspects, the DXE core owns MMU resources so it can manage memory type and cache/execute attributes of the memory regions.

Since the scheduler now owns certain hardware resources/services previously owned by the DXE core, in certain aspects, virtual hardware services are provided to the DXE core (e.g., by the scheduler) for the DXE core to use the hardware services owned by the scheduler. The virtual hardware services may run as separate threads on one or more CPU cores on SoC 100. In certain aspects, one or more of the virtual hardware service threads (e.g., timer thread) run on the same CPU core as the DXE core. In certain aspects, one or more of the virtual hardware service threads (e.g., timer thread) run on a different CPU core than the DXE core. For example, the virtual hardware services may provide exception handling which might result in a crash, timer interrupts to dispatch notifications to the DXE core, interrupts required to wakeup a CPU core when a CPU is put in sleep mode (e.g., when CPUSleep is called), etc.

In certain aspects, the virtual hardware services provide functionality based on services from the scheduler. In certain aspects, exceptions can be handled by the scheduler. In certain aspects, a virtual hardware service thread may receive a timer notification generated by a driver and use scheduler timer callbacks and events to send a notification to the DXE core. For example, if a timer notification is generated by a driver, the timer notification is sent as an event that unblocks a timer thread (e.g., previously launched during an initialization) so the timer thread issues the notification to the DXE core. In certain aspects, a CPU sleep service can also utilize the same event from timer callback to exit sleep. In certain aspects, a priority of a virtual hardware services thread, such as a timer thread, is higher than the DXE core thread in order to pre-empt the DXE core thread. The scheduler would schedule running of the threads, including the virtual hardware service threads and the DXE core thread.

In certain aspects, since the scheduler does not own memory resources, the PI/SEC stage may allocate memory (e.g., pre-allocate a fixed amount of memory) to the scheduler. In certain aspects, since the scheduler does not own the MMU, it may run in a physical 1:1 memory mapping across all cores. Further, all cores may share the same MMU table configuration instance.

In certain aspects, the scheduler is loaded and launched at the PI/SEC stage before DXE core is loaded and launched. In certain aspects, at least part of the PI/SEC stage is launched as a thread managed by the scheduler. In certain aspects, the DXE core executes as its own thread to provide lock functionality across the DXE boundary, and the DXE core thread is scheduled by the scheduler. In certain aspects, any virtual hardware services threads may be loaded and launched when timer services are normally initialized as part of a UEFI boot process.

Figure 6:
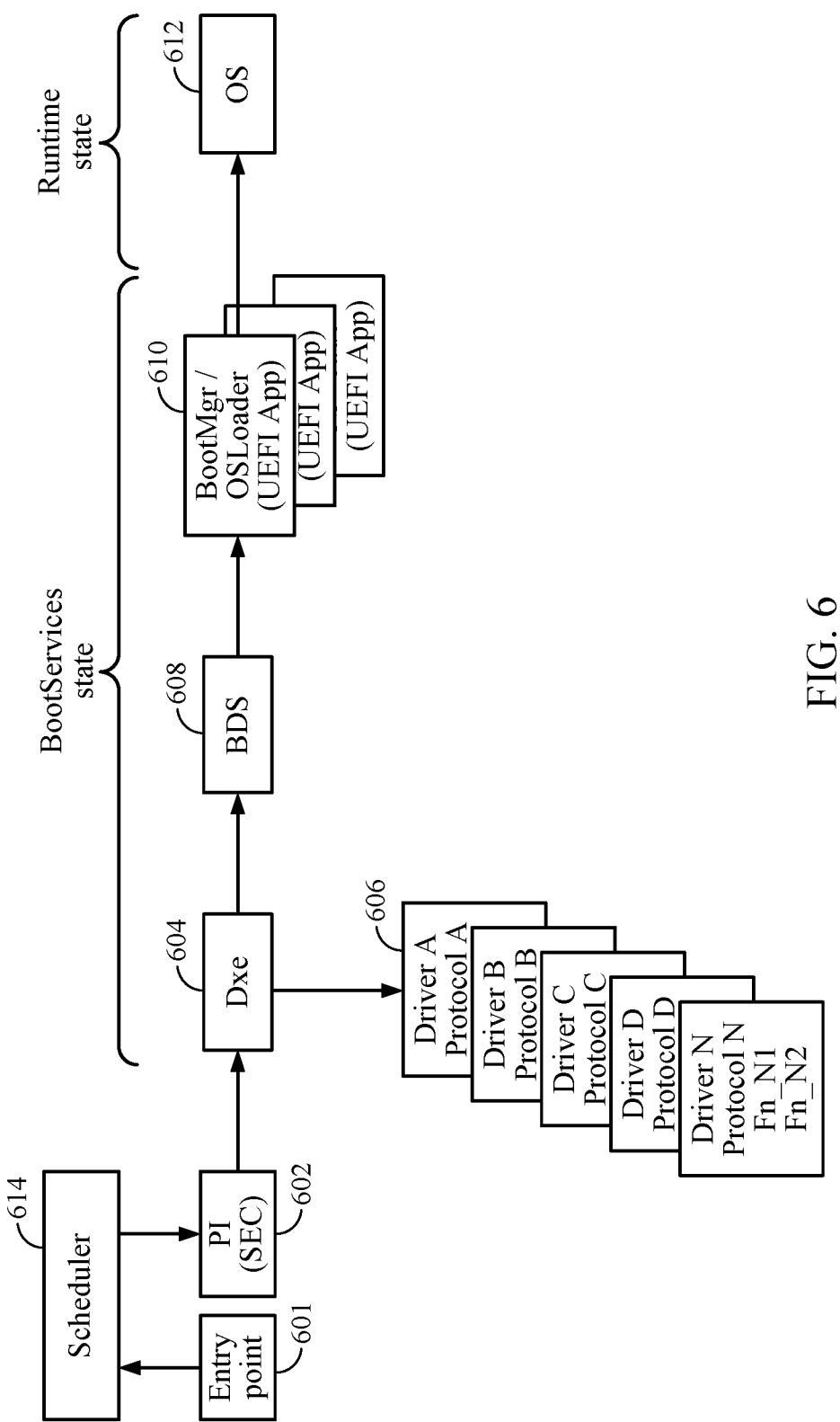
FIG. 6 is a block diagram that illustrates example boot phases (e.g., stages) for a SoC with an integrated scheduler, according to certain aspects of the disclosure.

FIG. 6 is a block diagram that illustrates example boot phases (e.g., stages) for a SoC with an integrated scheduler, according to certain aspects of the disclosure. As shown, FIG. 6 illustrates a PI 602, DXE 604, external images 606, BDS 608, applications 610, and OS 612, which may be similar to and correspond to PI 302, DXE 304, external images 306, BDS 308, applications 310, and OS 312 of FIG. 3. In FIG. 6, however, when entering the entry point 601 in code to the PI 602 stage, minimal initialization and memory allocation is performed and the scheduler 614 is launched. The scheduler 614 then includes code for launching the PI 602 as a thread. Further, as discussed, some of external images 606 may be for virtual hardware services drivers instead of actual hardware services drivers.

As discussed, in certain aspects, any transitions over the DXE boundary are serialized. In certain aspects, the DXE core is made up of two parts; a portion that drives the DXE environment (e.g., provides notifications, loads drivers, launches BDS, etc.), and a service/library portion that executes in the caller's context and is utilized by the drivers. The scheduler may provide locking mechanisms so that only one thread accesses the DXE core (e.g., one driver utilizes the service/library portion) at a time. In certain aspects, a thread acquires a lock of the DXE core when transitioning into the DXE boundary, such as making a call to a service/library of the DXE core, returning from a launched image, or returning from a notification call. In certain aspects, a thread releases the lock of the DXE core when transitioning out of the DXE boundary, such as returning from a call to a service/library of the DXE core, issuing a notification, or starting an image.

Figure 7:
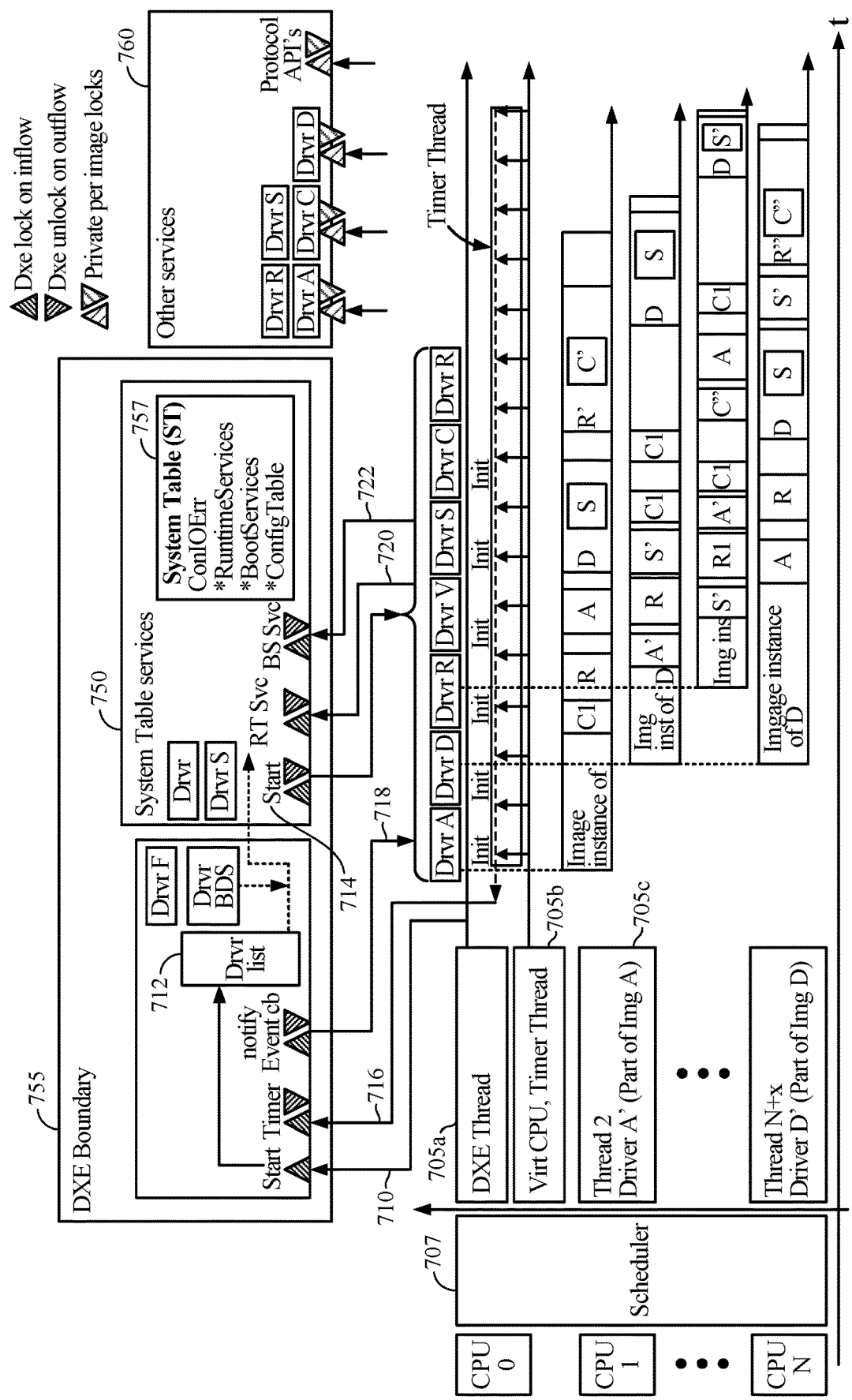
FIG. 7 is a block diagram that illustrates a locking mechanism across a DXE boundary implemented by a scheduler, according to certain aspects of the disclosure.

FIG. 7 is a block diagram that illustrates a locking mechanism across a DXE boundary implemented by a scheduler, according to certain aspects of the disclosure.

As shown, a plurality of CPU cores 0-N (e.g., CPU cores 111, 112, 121, 122) of a SoC (e.g., SoC 100) may run one or more threads 705 as discussed. For example, as shown, a scheduler 707 may schedule running of the threads 705 on the CPU cores 0-N. Though shown running on certain CPU cores 0-N, it should be noted that each of the threads 705 may be executed on any of the CPU cores 0-N.

Threads 705 include a DXE core thread 705*a* that runs the DXE core image and a virtual hardware resource/timer thread 705*b* that runs virtual hardware services as discussed. In certain aspects, the DXE core thread 705*a* and timer thread 705*b* are configured to run on the same CPU core, here shown as CPU core 0. In other aspects, the DXE core thread 705*a* and timer thread 705*b* are configured to run on different CPU cores (not shown). Threads 705 may include additional threads, each corresponding to a different driver (e.g., portion of an external image), application, etc.

Also shown is a representation of services 750 provided within a DXE boundary 755, and services 760 provided outside a DXE boundary.

In certain aspects, the DXE core thread 705*a* is first launched and it issues a start API call 710 that is one of services 750 provided within the DXE boundary, which locks access to the DXE core services (e.g., provided by the DXE core thread 705*a*) and begins executing the code of the DXE core image. While the DXE core services are locked, no other threads are able to call into the DXE core services such as to access the services provided by a ST 757 of the DXE core.

The DXE core thread 705*a* traverses a driver list 712 that lists drivers to be loaded in the pre-boot environment, picking one driver from the driver list 712 to start at a time. For example, the DXE core thread 705*a* may select a driver A to start and call the start image service 714 provided by the ST 757. In certain aspects, as discussed, the start image service 714 releases the lock held on the DXE core services and code is run that initializes the services of driver A such as on CPU core 0. In certain aspects, driver A may also initiate the timer thread 705*b* running on CPU core 0 (or another CPU core). The timer thread 705*b* may be configured to provide timer notification calls 716 (e.g., periodically) to the DXE core thread 705*a* as discussed. For example, when the timer thread 705*b* issues a timer notification call 716, it may acquire a lock to the DXE core services and the lock may be released after the timer notification call is handled by the DXE core as a return from the timer notification call. Similarly, DXE core thread 705*a* may issue to a thread an event callback 718 (or other notification), which may release a lock to the DXE core services and the lock may be acquired after the event callback 718 is handled by the thread as a return from the event callback 718.

In certain aspects, as part of the driver A initialization, an instance of driver A may be executed and run as a separate thread 705*c* shown running on CPU core 1 that runs in parallel with the DXE core thread 705*a*. Upon completion of the driver A initialization, the start image call 714 returns to the DXE core thread 705*a*, which locks the DXE core services. The DXE core thread 705*a* again traverses the driver list 712 and picks another driver to start in a similar fashion as driver A, which may lead to execution of additional threads 705 and drivers (e.g., A, D, R, V, S, C, BDS, F, etc.), as shown. Further, in some aspects, one of the drivers started by DXE core thread 705*a* may be a BDS driver which initiates the BDS stage and applications may be started and run as threads in a similar fashion as described with respect to driver A.

In certain aspects, each of the threads 705 may utilize services (e.g., runtime services and boot services) provided by the ST of the DXE core. For example, a thread 705 may make a call (e.g., runtime services call 720 or boot services call 722) to a service provided by the ST of the DXE core. As part of the call, the thread 705 acquires a lock to the DXE core services. When returning from the service call to the thread 705, the lock is released. If another thread tries to make a call to a service provided by the ST of the DXE core while the lock is held, the call is queued and is not completed until the lock is released, thereby serializing access to the DXE core services.

In certain aspects, the DXE core thread 705*a* itself may further call services in ST 757. However, the DXE core services may already be locked when the DXE core thread 705*a* itself calls services in ST 757. Accordingly, the DXE core thread 705*a* may be configured to perform recursive locking where it can acquire additional locks on itself for each service it calls on itself. Each return may release the acquired recursive lock, and the DXE core services may only be unlocked and available to other threads once all the recursive locks have been released. In certain aspects, other threads (e.g., all threads utilizing DXE core services) may be configured to perform such recursive locking and releasing.

In certain aspects, different threads can not only utilize services 750 provided by the DXE core, but also services 760 provided by other drivers or applications that are outside the DXE boundary 755. For example, as shown, thread 705*c* may utilize services related to a driver C1 that are part of services 760. The services of driver C1 may have been previously initialized as discussed. In certain aspects, when thread 705*c* utilizes the services of driver C1, since it is outside the DXE boundary, it does not acquire a lock to the DXE core services and can run in parallel with other threads 705 including the DXE core thread 705*a* providing services within the DXE boundary. In certain aspects, each service outside the DXE boundary that is not thread safe may have its own associated lock, similar to DXE core services. For example, driver services C1 may have an associated lock, and when another thread requests driver services C1, it acquires the lock to driver services C1 such that another thread cannot access driver services C1. When driver services C1 returns from the call, the lock to driver services C1 is released and other threads can access driver services C1. Accordingly, multiple driver services can run in parallel with respect to one another in different thread contexts, however, some individual services may run in serial with respect to themselves.

Certain aspects herein relate to avoiding dead lock situations when acquiring locks, such as to the DXE core services. For example, in certain aspects, a driver/application thread launched by the DXE core thread 705a may call a waitforevent or checkevent service (or another similar service) provided by the DXE core services. Accordingly, when calling the waitforevent or checkevent service, the thread acquires a lock for the DXE core services. The waitforevent or checkevent service is configured to cause the DXE core thread 705a to enter sleep mode by starting a CPU core idle process and wait for an interrupt to occur to exit the CPU core idle process. As discussed, in certain aspects interrupts are owned by and routed to the scheduler 707 and therefore a timer callback made to the DXE core thread 705a using a timer thread 705b may be used as an interrupt. However, since the thread that called the waitforevent or checkevent service has acquired the lock to DXE core services, the timer thread 705b cannot issue the timer callback to the DXE core thread 705a as it cannot acquire the lock. This results in a deadlock situation.

Accordingly, in certain aspects, interdependency is created between virtual hardware resource threads like timer thread 705b and the waitforevent or checkevent service. In particular, when the timer thread 705b receives a timer interrupt event (e.g., from a driver, hardware, etc.) it checks to see if the DXE core thread 705a is in a sleep mode or idle such as due to a waitforevent or checkevent service. If not, the timer thread 705b issues a timer notification call as discussed. However, if the DXE core thread 705a is in a sleep mode or idle, the timer thread 705b is configured to notify the CPU core idle process so that the idle process itself unblocks itself, returns, and release the lock.

In certain aspects, if any APIs/threads are blocking access to DXE core services by holding a lock to the DXE core services that expect a timer notification (e.g., a timer thread) to unblock access, there may be some interdependency so that the timer notification occurs in the thread context of whatever thread already holds the lock. Such a method alleviates the possibility of a deadlock between a timer thread and a thread holding the lock.

In certain aspects, certain APIs do not both perform the acquisition and release of a lock to the DXE core services as discussed. For example, certain APIs, such as raiseTPL and restoreTPL modify the state of the DXE core thread 705a. Due to this, such APIs may not have both an inbound and outbound transition of the DXE boundary. Accordingly, in certain aspects, when a raiseTPL call is made by a thread, a lock is acquired to the DXE core services. Further, when the thread issues a restoreTPL call, the lock is released for the DXE core services.

Figure 8:
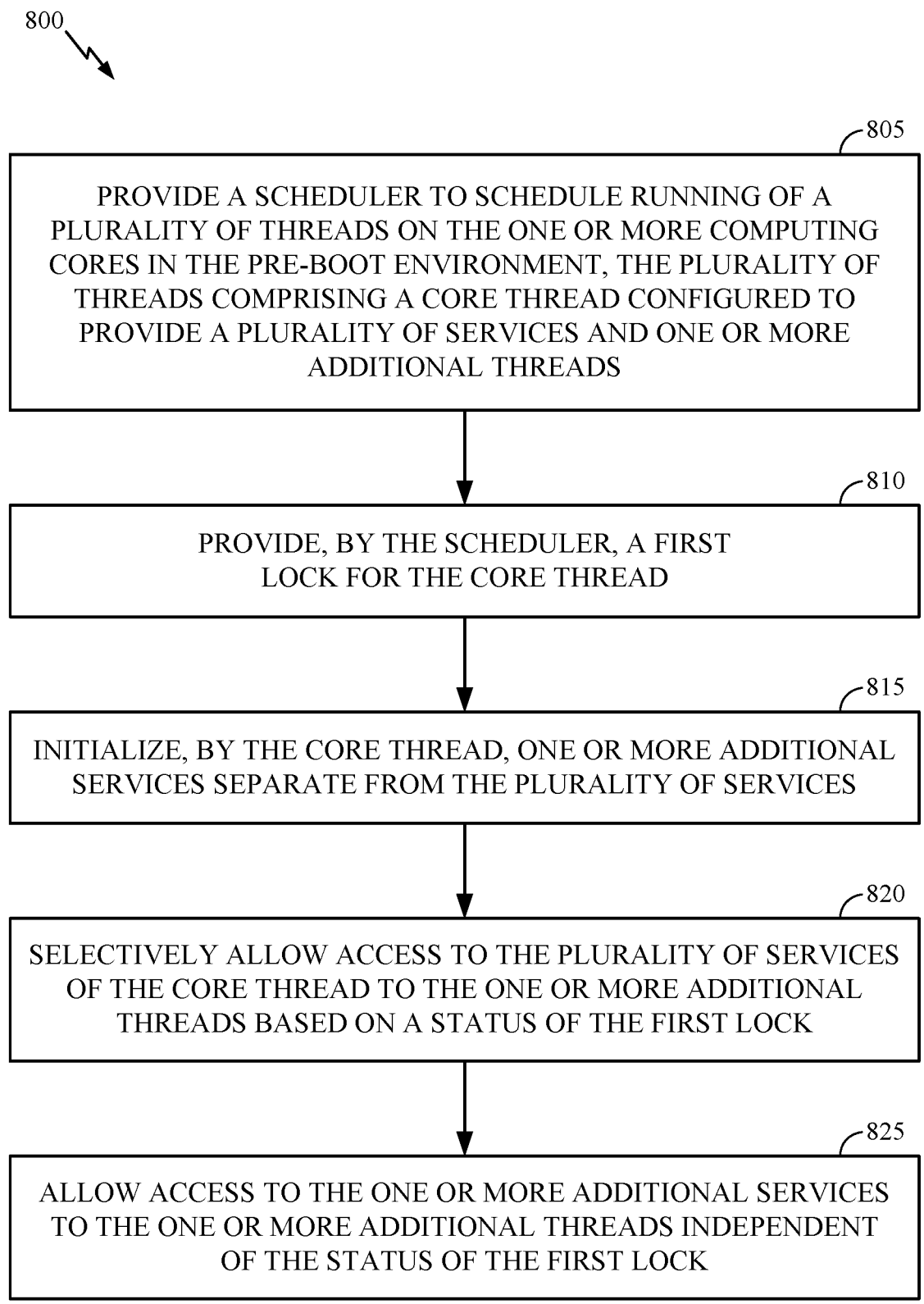
FIG. 8 is a flow chart that illustrates example operations for enabling a multithreading framework in a pre-boot environment for a system-on-chip (SoC), in accordance with certain aspects of the present disclosure

FIG. 8 is a flow chart that illustrates example operations 800 for enabling a multithreading framework in a pre-boot environment for a system-on-chip (SoC), in accordance with certain aspects of the present disclosure. For example, the operations of FIG. 8 may be performed by the SoC 100, or another suitable circuit.

At step 805, a scheduler is provided to schedule running of a plurality of threads on the one or more computing cores in the pre-boot environment, the plurality of threads comprising a core thread configured to provide a plurality of services and one or more additional threads;

At step 810, the scheduler provides a first lock for the core thread.

At step 815, the core thread initializes one or more additional services separate from the plurality of services.

At step 820, selective access is allowed to the plurality of services of the core thread to the one or more additional threads based on a status of the first lock.

At step 825, access is allowed to the one or more additional services to the one or more additional threads independent of the status of the first.

In some configurations, the term(s) 'communicate,' 'communicating,' and/or 'communication' may refer to 'receive,' 'receiving,' 'reception,' and/or other related or suitable aspects without necessarily deviating from the scope of the present disclosure. In some configurations, the term(s) 'communicate,' 'communicating,' 'communication,' may refer to 'transmit,' 'transmitting,' 'transmission,' and/or other related or suitable aspects without necessarily deviating from the scope of the present disclosure.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits.

One or more of the components, steps, features and/or functions illustrated herein may be rearranged and/or combined into a single component, step, feature or function or embodied in several components, steps, or functions. Additional elements, components, steps, and/or functions may also be added without departing from novel features disclosed herein. The apparatus, devices, and/or components illustrated herein may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

These apparatus and methods described in the detailed description and illustrated in the accompanying drawings by various blocks, modules, components, circuits, steps, processes, algorithms, etc. (collectively referred to as "elements"). These elements may be implemented using hardware, software, or combinations thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, firmware, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, or combinations thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, PCM (phase change memory), flash memory, CD-ROM or other optical disc storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc. Combinations of the above should also be included within the scope of computer-readable media.

What is claimed is:

1. A method of enabling a multithread framework in a pre-boot environment for a system-on-chip (SoC) comprising one or more computing cores, the method comprising:
   providing a scheduler to schedule running of a plurality of threads on the one or more computing cores in the pre-boot environment, the plurality of threads comprising a core thread configured to provide a plurality of services and one or more additional threads;
   providing, by the scheduler, a first lock for the core thread;
   initializing, by the core thread, one or more additional services separate from the plurality of services;
   selectively allowing access to the plurality of services of the core thread to the one or more additional threads based on a status of the first lock; and
   allowing access to the one or more additional services to the one or more additional threads independent of the status of the first lock;
   upon receiving an interrupt event, determining by a timer thread if the core thread is running an idle process;
   indicating by the timer thread to the idle process to return from idle when the core thread is running the idle process; and
   issuing a timer callback to the core thread when the core thread is not running the idle process.

2. The method of claim 1, further comprising providing, by the scheduler, one or more additional locks for the one or more additional services, wherein allowing access to the one or more additional services to the one or more additional threads comprises selectively allowing access to the one or more additional services to the one or more additional threads based on status of the one or more additional locks.

3. The method of claim 1, further comprising:
   acquiring, by a first thread of the one or more additional threads, the first lock when calling one of the plurality of services; and
   releasing the first lock when returning from the one of the plurality of services.

4. The method of claim 1, further comprising:
   launching the scheduler prior to executing the core thread; and
   launching the core thread by the scheduler.

5. The method of claim 1, wherein one of the plurality of threads comprises the timer thread configured to provide interrupt service to the core thread.

6. The method of claim 1, further comprising:
   acquiring, by a first thread of the one or more additional threads, the first lock when making a raise task priority list call; and
   releasing the first lock when making a restore task priority list call.

7. The method of claim 1, wherein the pre-boot environment comprises a Unified Extensible Firmware Interface (UEFI) pre-boot environment.

8. A system-on-chip (SoC) comprising:
   a memory; and
   one or more computing cores coupled to the memory, the one or more computing cores being configured to:
      provide a scheduler to schedule running of a plurality of threads on the one or more computing cores in a pre-boot environment, the plurality of threads comprising a core thread configured to provide a plurality of services and one or more additional threads;
      provide, by the scheduler, a first lock for the core thread;

initialize, by the core thread, one or more additional services separate from the plurality of services;

selectively allow access to the plurality of services of the core thread to the one or more additional threads based on a status of the first lock; and allow access to the one or more additional services to the one or more additional threads independent of the status of the first lock;

upon receiving an interrupt event, determine by a timer thread if the core thread is running an idle process;

indicate by the timer thread to the idle process to return from idle when the core thread is running the idle process; and issue a timer callback to the core thread when the core thread is not running the idle process.

9. The SoC of claim 8, wherein the one or more computing cores are further configured to provide, by the scheduler, one or more additional locks for the one or more additional services, wherein allowing access to the one or more additional services to the one or more additional threads comprises selectively allowing access to the one or more additional services to the one or more additional threads based on status of the one or more additional locks.

10. The SoC of claim 8, wherein the one or more computing cores are further configured to:

acquire, by a first thread of the one or more additional threads, the first lock when calling one of the plurality of services; and release the first lock when returning from the one of the plurality of services.

11. The SoC of claim 8, wherein the one or more computing cores are further configured to:

launch the scheduler prior to executing the core thread; and launch the core thread by the scheduler.

12. The SoC of claim 8, wherein one of the plurality of threads comprises the timer thread configured to provide interrupt service to the core thread.

13. The SoC of claim 8, wherein the one or more computing cores are further configured to:

acquire, by a first thread of the one or more additional threads, the first lock when making a raise task priority list call; and release the first lock when making a restore task priority list call.

14. The SoC of claim 8, wherein the pre-boot environment comprises a Unified Extensible Firmware Interface (UEFI) pre-boot environment.

15. A non-transitory computer readable storage medium that stores instructions that when executed by a system-on-chip (SoC) comprising one or more computing cores cause the SoC to perform a method of enabling a multithread framework in a pre-boot environment, the method comprising:

providing a scheduler to schedule running of a plurality of threads on the one or more computing cores in the pre-boot environment, the plurality of threads comprising a core thread configured to provide a plurality of services and one or more additional threads;

providing, by the scheduler, a first lock for the core thread;

initializing, by the core thread, one or more additional services separate from the plurality of services;

selectively allowing access to the plurality of services of the core thread to the one or more additional threads based on a status of the first lock;

allowing access to the one or more additional services to the one or more additional threads independent of the status of the first lock;

upon receiving an interrupt event, determining by a timer thread if the core thread is running an idle process;

indicating by the timer thread to the idle process to return from idle when the core thread is running the idle process; and issuing a timer callback to the core thread when the core thread is not running the idle process.

16. The non-transitory computer readable storage medium of claim 15, wherein the method further comprises providing, by the scheduler, one or more additional locks for the one or more additional services, wherein allowing access to the one or more additional services to the one or more additional threads comprises selectively allowing access to the one or more additional services to the one or more additional threads based on status of the one or more additional locks.

17. The non-transitory computer readable storage medium of claim 15, wherein the method further comprises:

acquiring, by a first thread of the one or more additional threads, the first lock when calling one of the plurality of services; and releasing the first lock when returning from the one of the plurality of services.

18. The non-transitory computer readable storage medium of claim 15, wherein the method further comprises:

launching the scheduler prior to executing the core thread; and launching the core thread by the scheduler.

19. The non-transitory computer readable storage medium of claim 15, wherein one of the plurality of threads comprises the timer thread configured to provide interrupt service to the core thread.

20. The non-transitory computer readable storage medium of claim 15, wherein the method further comprises:

acquiring, by a first thread of the one or more additional threads, the first lock when making a raise task priority list call; and releasing the first lock when making a restore task priority list call.

21. A system-on-chip (SoC) comprising:

means for providing a scheduler to schedule running of a plurality of threads on one or more computing cores in a pre-boot environment, the plurality of threads comprising a core thread configured to provide a plurality of services and one or more additional threads;

means for providing, by the scheduler, a first lock for the core thread;

means for initializing, by the core thread, one or more additional services separate from the plurality of services;

means for selectively allowing access to the plurality of services of the core thread to the one or more additional threads based on a status of the first lock;

means for allowing access to the one or more additional services to the one or more additional threads independent of the status of the first lock;

means for upon receiving an interrupt event, determining by a timer thread if the core thread is running an idle process;

means for indicating by the timer thread to the idle process to return from idle when the core thread is running the idle process; and means for issuing a timer callback to the core thread when the core thread is not running the idle process.

22. The SoC of claim 21, further comprising means for providing, by the scheduler, one or more additional locks for the one or more additional services, wherein allowing access to the one or more additional services to the one or more additional threads comprises selectively allowing access to the one or more additional services to the one or more additional threads based on status of the one or more additional locks.

23. The SoC of claim 21, further comprising:
   means for acquiring, by a first thread of the one or more additional threads, the first lock when calling one of the plurality of services; and
   means for releasing the first lock when returning from the one of the plurality of services.

24. The SoC of claim 21, further comprising:
   means for launching the scheduler prior to executing the core thread; and
   means for launching the core thread by the scheduler.

25. The SoC of claim 21, wherein one of the plurality of threads comprises the timer thread configured to provide interrupt service to the core thread.

26. The SoC of claim 21, further comprising:
   means for acquiring, by a first thread of the one or more additional threads, the first lock when making a raise task priority list call; and
   means for releasing the first lock when making a restore task priority list call.

* * * * *